Patented Sept. 1, 1942

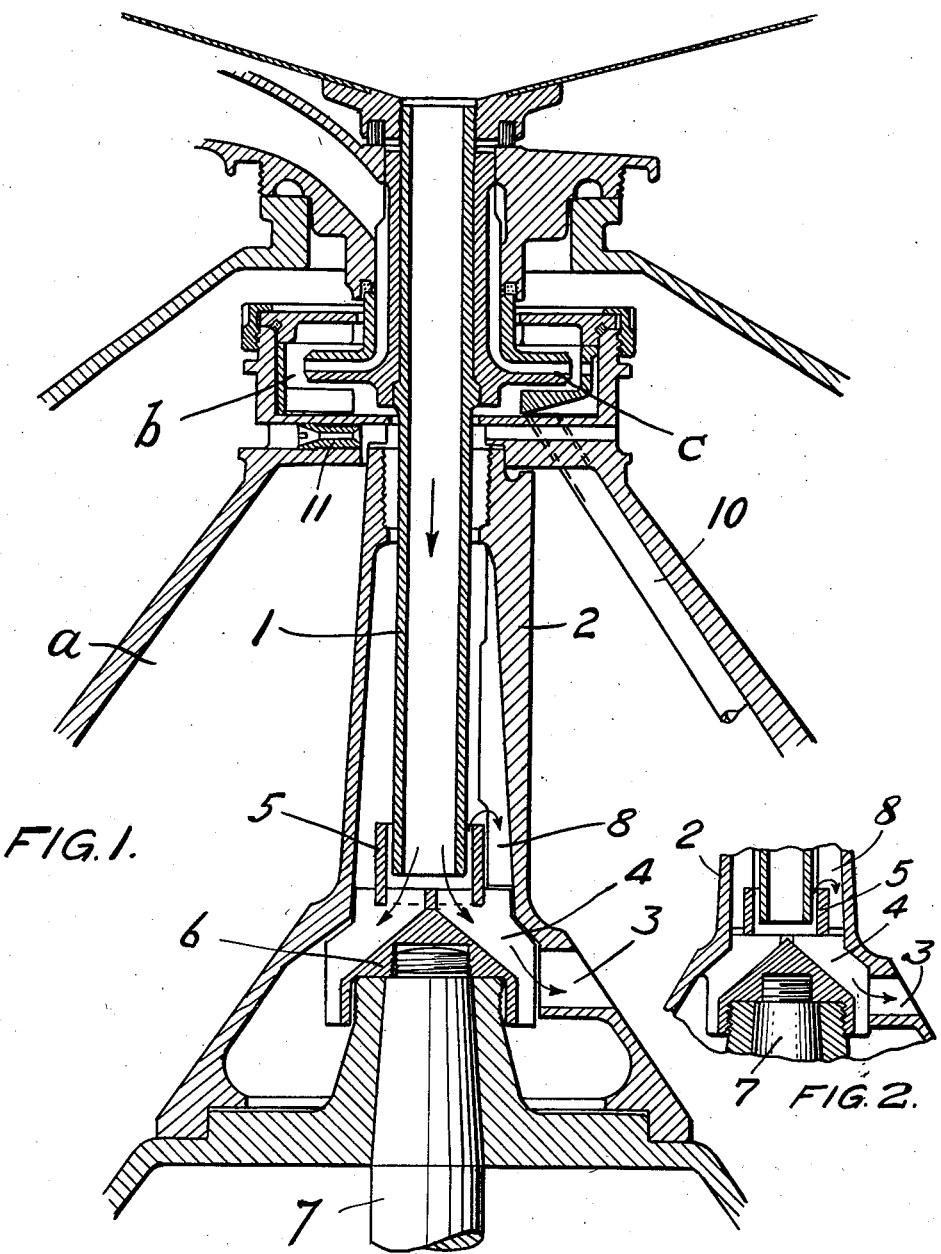

2,294,468

UNITED STATES PATENT OFFICE 2,294,468

CENTRIFUGAL SEPARATOR

Hans Olof Lindgren, Appelviken, Sweden, assignor to The De Laval Separator Company, New York, N. Y., a corporation of New Jersey Application March 7, 1940, Serial No. 322,711
In Sweden May 27, 1939

2 Claims. (Cl. 233—40)

In the centrifugal separators for separating whole milk into cream and skim milk in which the whole milk is fed into the separator bowl in a free jet, the fat globules may be so split up as to substantially increase the fat content of the skim milk. It is known, also, to feed whole milk into the separator bowl under pressure through a pipe communicating with the bowl by a packing device. In the latter arrangement the bowl is kept wholly filled with liquid so that the loss due to impact is reduced, thereby reducing the atomization of the fat globules, which results in an improved skimming effect; but the provision of a satisfactory tightening or sealing device between the bowl and the spindle involves an undesirable complication.

The object of my invention is to provide a centrifugal separator which does not necessitate feeding the supply liquid to the bowl under pressure, but which greatly reduces impact and resultant splitting up of fat globules and froth formation.

A preferred embodiment of the invention is shown in the accompanying drawing, in which Fig. 1 is a vertical sectional view of a centrifugal separator embodying my invention and Fig. 2 is a detail view, also in vertical cross-section, of a modification.

The whole milk to be separated is fed through a central stationary feed tube 1 into a distributor 2 that communicates, through holes 3, with the separating chamber a of the bowl and the discs (not shown) contained thereoin. The distributor 2 is open at the top and may communicate with the atmosphere through openings in the bowl wall in order to ensure constant pressure in the interior of the bowl.

Inside the distributor 2 are conveyor wings 4 extending below the lower discharge end of the feed tube above which extends a tubular member 5 surrounding the lower end of the feed tube. The annular space between the feed tube and tubular member is preferably no wider than is necessary to prevent contact between them during rotation of the bowl.

The wing system 4 overlies a nut 6 fixed to the bowl spindle 7. The nut has, preferably, a conical upper face having a central apex located along the axis of the bowl, thereby being adapted smoothly to deflect the liquid jets discharging from the lower end of the feed tube.

The wing system 4 preferably spans the space between the conical nut and the distributor wall and outlet therethrough to the separating chamber of the bowl.

The distributor 2 should be provided with additional conveyor wings 8 between the distributor wall and the tubular member 5 and extending (preferably) up to the upper end of the distributor. Between the distributor wall and the tubular member 5 are thus provided channels which permit any liquid leaking or splashing upward through the annular space between the feed tube and the tubular member 5 to be conveyed to the channels between the conveyor wings 8 and 4 and thence to the separating chamber.

In operation the whole milk discharged from the lower end of the stationary feed tube 1 flows directly into the downwardly and outwardly radiating closed channels formed by the conical surface of nut 6 constituting the bottom of the distributing chamber, the wall of the distributing chamber and the wings 4. In its flow through these channels the rotational speed of the whole milk increases from substantially zero to a velocity corresponding substantially to that of the inner wall of milk inside the distributor, thereby entering that wall without shock. The outer ends of these radial channels terminate at approximately the level of the hole or holes 3 connecting the distributor chamber with the separating space of the bowl. The described course of the whole milk is indicated by arrows. Any liquid splashing upward from the bottom of the feed tube 1 will flow through the narrow annular space between the lower end of the feed tube and the tube 5 and thence down through the channels formed between the wings 8, the tubular member 5 and the wall of the distributor to and thence into the channels formed by the wings 4.

By the described construction a more nearly impactless supply of liquid is obtained than if the liquid were fed into the distributor in ways customary in non-closed bowls. Much less froth is mixed with the milk at the inlet, which is an important advantage, since milk which becomes mixed with froth is more difficult to separate than milk not so mixed.

The wings are preferably secured to the member 6 as shown in Fig. 1, but they may be secured to the distributor wall, or less desirably to both. Fig. 2 is illustrative of either of the last two-named constructions. The tube 5 is preferably supported on the wings 4, as shown in Fig. 1, but it may be secured to and supported by wings 8, as shown in Fig. 2.

The invention is not limited to the location of the inlet chamber of the distributor at any particular height with respect to the bowl and spindle, nor to any details of construction, location and arrangement not specified in the appended claims.

The invention is particularly adapted, although not necessarily limited, to be applied to that type of separator provided with a parer chamber rotating with the bowl and into which one of the liquids separated in the bowl flows and from which such liquid is withdrawn by means of a stationary parer. Such a parer chamber *b* and parer *c* are shown in the drawing. The separated skim milk is discharged from the peripheral zone of the separator through the tube 10 communicating with the parer chamber *b*. The separated cream is discharged from the central or inner zone of the separator through the cream screw 11. The structural details of the machine, aside from the means for feeding the whole milk to the separating chamber, are not further described, since they form no part of the invention.

What I claim and desire to protect by Letters Patent is:

1. A centrifugal separator comprising a rotary bowl and a rotary central distributing chamber forming between them a separating chamber, the lower end portion of the distributing chamber opening into the separating chamber, a stationary feed tube extending down into, and through a considerable part of the length of, the distributing chamber and at its lower end opening thereinto above its bottom, wings, below the open lower end of the feed tube, rotating with the bowl and extending outward from the axis thereof and substantially spanning the space between the bottom of the distributing chamber and its side wall, the outer edges of the wings being at the level of the opening from the distributing chamber to the separating chamber, thereby forming closed flow channels within which the feed liquid flows from the feed tube to the separating chamber, and a tubular member within the distributing chamber and extending above said wings and surrounding and spaced from the lower end of the feed tube and spaced throughout its circumference a substantial distance from the wall of the distributing chamber and forming an annular space through which any liquid, splashing upward from the feed tube will be conveyed to the distributor chamber.

2. The centrifugal separator defined in claim 1 and comprising also vertically-extending wings substantially spanning the annular space above the first named wings between the distributor wall and said feed tube and tubular member and forming channels through which any feed liquid splashing upward between the feed tube and the tubular member will be conveyed downward to the channels formed between the first named wings.

HANS OLOF LINDGREN.